United States Patent [19]

Millward

[11] 4,205,337
[45] May 27, 1980

[54] TELEVISION FILM SCANNER

[75] Inventor: John David Millward, Hitchin, England

[73] Assignee: The Rank Organisation Limited, London, England

[21] Appl. No.: 922,108

[22] Filed: Jul. 5, 1978

[30] Foreign Application Priority Data

Jul. 6, 1977 [GB] United Kingdom ............... 28285/77

[51] Int. Cl.² .......................... H04N 5/36; H04N 9/04
[52] U.S. Cl. ...................................... 358/54; 358/214; 358/216
[58] Field of Search ......................... 358/54, 214, 216

[56] References Cited
U.S. PATENT DOCUMENTS

| | | | |
|---|---|---|---|
| 2,922,841 | 1/1960 | Graziano | 358/216 |
| 3,803,353 | 4/1974 | Sanderson | 358/213 X |

Primary Examiner—Robert L. Richardson
Attorney, Agent, or Firm—Brisebois & Kruger

[57] ABSTRACT

Apparatus for producing television picture signals from motion picture film by scanning the film horizontally at a scanning station while transporting the film continuously past the scanning station is provided with means for accommodating different film sizes, transport speeds and film format by changing the frequency of the horizontal scan while performing a predetermined number of horizontal line scans in respect of each frame of the film; the line scan signals are stored in a memory, and the memory read to produce a plurality of television picture fields at a different frequency from that at which scanning takes place. The frequency at which the television picture fields are generated is higher than that at which the line scan is effected so that the two are made temporally compatible by repeating certain television fields in order to "fill-in" for spare time.

15 Claims, 3 Drawing Figures

TELEVISION FILM SCANNER

The present invention relates to television apparatus and particularly to television apparatus for producing television picture signals from motion picture film.

Apparatus for producing television picture signals from motion picture film is known as such, and such apparatus includes means for scanning the motion picture film to produce a plurality of signals from a sensor or a plurality of sensors the output signals from which are then processed to provide the television picture signals. The scanning may be performed as area scanning, or as linear scanning; in the former case the motion picture film is transported in the same way as it would be in a cine projector, being advanced by one frame at a time and held stationary while a light beam is scanned in a raster pattern over the frame, light transmitted through the motion picture film being focussed onto a sensor or an array of sensors the outputs from which are then processed to provide the television picture signals. Alternatively, linear scanning may be effected by transporting the film at a substantially constant speed and effecting only a side-to-side scan at a frequency sufficiently high to cover the whole of the area of the film.

For convenience of reference the direction along the length of the film will be referred to hereinafter as the "vertical" direction and the direction transverse the film will be referred to as the "horizontal" direction, and references to "horizontal" and "vertical" directions will be understood to relate to these with reference to the normal picture orientation of a motion picture film and a television picture image as frame of reference. It will be understood, that the film transport at the scanning station may in fact take place in any convenient direction with respect to a fixed frame of reference. When using linear scanning the side-to-side or horizontal scan is usually effected at the same frequency as the horizontal line scan of the television raster, but the vertical speed of film transport is determined by the film parameters since playing the film at a speed other than for which it was made would result in speeding up or slowing down the image movements. If the apparatus is constructed for use in a given mode with a motion picture film of a given gauge, cinemascope format and standard film frame size, dimensions of the apparatus can be arranged to match the motion picture film. However, if it is necessary for the apparatus to be used in different modes or with different gauges of film which may have been exposed at different speeds and which may have different cinemascope formats (i.e. frame shape) the number of lines of the raster scan performed in the time taken for one film frame to pass will vary from the correct number for filling the television raster area, and since there are, in general, no direct means for varying the scan height, the number of scan lines (or aspect ratio) in each film frame will be different from the correct number. In fact, for a given apparatus there will be only one mode of operation and one film speed where the correct number of scan lines or aspect ratio is produced, and this may not be the required film speed.

One possible solution to this problem would be to vary the length of the line scan in order to obtain the correct aspect ratio. However, this would product a non-standard scan size which would therefore be undesirable. The aspect ratio could be corrected by passing the television picture signals, once produced, through a standards converter where the incorrect line standard produced by transporting the film at its correct speed can be converted to the correct line standard. This would entail the use of line interpolation, however, when converting from one line standard to another, which could be extremely complex, particularly when several different conversions may be required.

The present invention seeks, therefore, to provide apparatus which is capable of adjustment in a simple manner to compensate for differences in the motion picture film parameters so that the correct aspect ratio (that is, number of scan lines in each film frame) is correct for a television standard in use.

According to the present invention there is provided apparatus for producing television picture signals from motion picture film by scanning the film horizontally at a scanning station while transporting the film vertically past the scanning station, in which there are provided means for adjusting the frequency of the horizontal scan to accommodate different film sizes, transport speeds and television standards whilst performing a number of horizontal line scans in respect of each frame of the motion picture film, determined by the television standard being used at any one time, and means for producing, from the line scan signals, a plurality of television picture signals at a horizontal line frequency corresponding to that of the television standard being used at any one time. In general, adjustment of the frequency of the horizontal scanning of the film to give the correct aspect ratio will result in a horizontal line frequency different from that of the television standard being used and therefore means must be provided to convert from the frequency of horizontal scanning of the film to the horizontal scan frequency of the television standard being used.

It will be appreciated by those skilled in the art that the horizontal line scan signals produced by a system such as that outlined above will be line sequential, whereas standard television signals are interlaced, so that a converter for receiving the sequential line signals and producing the output signals in an interlaced manner is required. Sequential signals, for a 625 line picture, for example, occur in sequence from line 1 to line 625, whereas an interlaced scan means that the odd lines, that is lines 1, 3, 5, 7 etc., are scanned first (with twice the spacing of the sequential scan) followed by the interleaved even lines Nos. 2, 4, 6 etc. Each scan of half the total number of lines is called a television field, the first being the "odd" field and the second the "even" field, and the two fields together produce a television picture frame.

Line sequential horizontal scan signals are thus first generated by the apparatus by scanning the film one line at a time as it is transported at constant speed past the scanning station. These signals are then stored in suitable storing means and the stores are read in a predetermined pattern to produce the television fields. Because the sequential line scan signals being fed into the stores will arrive at a frequency dependent on the film parameters (that is film gauge, transport speed and cinemascope format) which will not necessarily correspond with the rate at which the stores must be read to provide television picture fields at the appropriate standard, groups of signals in the stores representing one field are sometimes read twice or more, reading being effected at regular intervals in order to "fill-in" for missing fields. This is possible because the television standards require fifty or sixty fields per second whereas the motion picture film frames are exposed at either twenty-four or twenty-five frames per second.

Preferably the said means for adjusting the scanning frequency includes a variable frequency oscillator having means for adjusting its operating frequency in dependence on the motion picture film parameters, that is the film transport speed, the film gauge, and/or the film format (cinemascope), and in dependence on the television standard in use.

In one embodiment changes to the scanning frequency are made by changing the rate at which an array of sensors is scanned, whereas in another embodiment the rate at which the array of sensors is scanned remain fixed and changes in the frequency are effected by varying the time interval between successive scans.

In this latter embodiment it is preferred that the time interval between successive scans is controlled by a programmable counter the programmed count of which is controlled by inputs representing the film speed, the film gauge and the film format.

The linear scanning may be effected in one of a number of ways: for example, there may be provided an array of sensors in a line, all illuminated with light transmitted through the motion picture film, and each sequentially operated whereby to produce a plurality of discrete signals together representing the information content of a television scan line. Alternatively, however, the scanning may be effected by means of a laser, the horizontal deflection being produced by an oscillating mirror or other means; the light, having passed through the film, is collected and directed towards a photo-sensor. For colour television signals there would be provided, of course, individual sensors with associated colour filters, for producing output signals representing the information content of the three colour television channels.

For processing, the output signals from the sensors are preferably converted into digital form and stored in at least one store the outputs from which are controlled by a logic circuit which determines the rate of field production and is synchronised with the studio or station sync generator. Preferably, as is often done in television cameras, the sensor signals are separated into chrominance and luminance signals which are stored in separate stores and the chrominance signals representing the three colour channels are combined to form two colour difference signals in a known way. Likewise, it is preferred that the chrominance signals (either as three colour channel signals or as two colour difference signals) are multiplexed and fed sequentially into a single store, the luminance signal being fed into a separate store.

The arrangement of the stores will depend on the range of motion picture film parameters and television standards which it is intended to accommodate and the type of memory elements employed, their prime function being to convert the sequential input to interlaced output and also to convert the variable horizontal and vertical frequency input to a fixed frequency output, locked to the chosen television standard.

In one embodiment of the invention the stores are formed with a plurality of storage blocks each having a capacity to store signals representing the information content of a predetermined number of lines (this number being a factor of the number of lines in a television field), the store control logic circuit operating to feed out the signals from the store blocks in one of the number of predetermined sequences in dependence on the film parameters and to repeat the output from certain groups of store blocks containing signals representing the information content of one television field in accordance with a predetermined program, so as to achieve a predetermined rate of output of television fields independently of the rate of generation of television fields by the scanning system. The program to which the logic circuit operates may be determined solely by the frequency to which the variable frequency oscillator is set since, in general, this frequency will uniquely identify the set of parameters of the motion picture film. The capacity of the blocks of the store or stores is preferably a factor of the number of lines in a television field and the number of blocks of a store required to contain the information content of a single television field is preferably determined by the highest common factor between the frequency of the motion picture film frames and the frequency of the television picture frames.

There are preferably also further provided counting means controlled by the output from the variable frequency oscillator, for controlling the duration of each line scan and the duration of the blanking interval between successive scans, in dependence on the frequency of the variable frequency oscillator.

Various embodiments of the present invention will now be more particularly described, by way of example, with reference to the accompanying drawings, in which.

Figure 1:
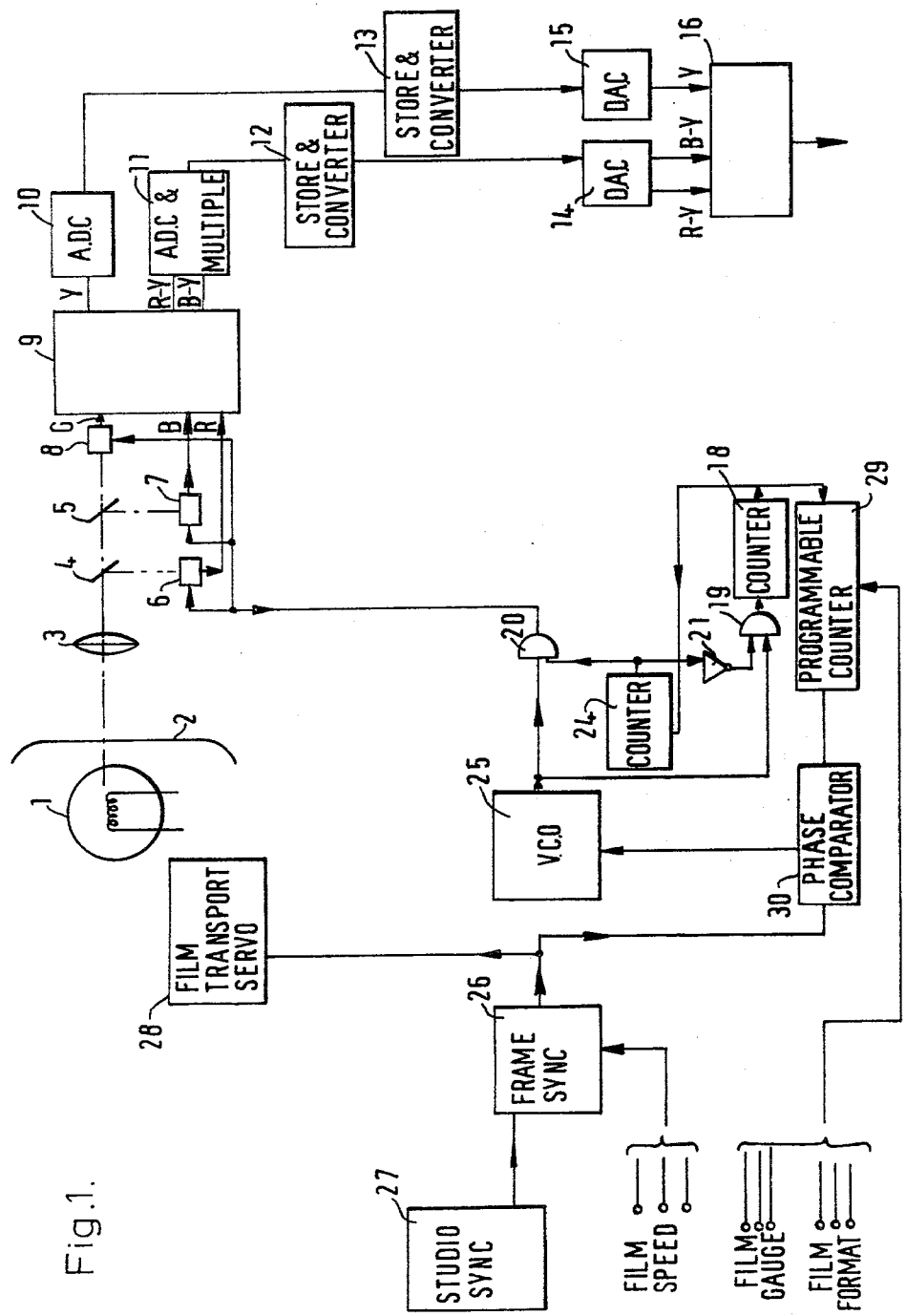
FIG. 1 is a block schematic diagram illustrating a first embodiment.

Referring first to FIG. 1 of the drawings, the apparatus shown comprises a light source 1, positioned to transmit light through a motion picture film 2 which is transported at a constant speed past a scanning station defined by the light source 1 and a lens 3 which focuses light transmitted through the motion picture film 2 onto photo sensors 6, 7, 8. Incident light is filtered by two colour filters 4, 5 so that the sensor 6 receives light from the red end of the spectrum, the sensor 7 receives light from the blue end of the spectrum and the sensor 8 receives the mid range or "green" channel light. The output signals from the sensors 6, 7, 8 are fed into a video processing circuit 9 which produces three output signals, that is the luminance signal Y and two colour difference chrominance signals R-Y and B-Y. The luminance signal Y is fed to an analogue-to-digital converter 10 and the two colour difference signals R-Y and B-Y are fed to an analogue-to-digital converter 11 where, in addition to being converted to digital form they are also multiplexed and fed out to a chrominance store and converter 12. The luminance signal Y is fed from the analogue-to-digital converter 10 to a luminance store and converter 13.

The two stores 12 and 13 are used to convert the sequential scan input to interlaced scan output and also to convert the variable horizontal and vertical frequency input to a fixed frequency output locked to the television standard to be transmitted. The output signals from the two stores 12, 13 are fed in groups constituting television fields to respective digital-to-analogue converters 14, 15 from which the R-Y and B-Y chrominance signals and the luminance signal Y are fed to an encoder 16 operating in a conventional way to encode the signals for transmission.

The transport of the motion picture film 2 past the scanning station is synchronised, by means of a film transport servo 28 with the operation of the television signal generating circuits. The film transport servo 28 is fed with control signals from a film frame sync pulse generator 26 which in turn is controlled by pulses received from a studio or station sync pulse generator 27, so that the phase relationship of the film frame is controlled and therefore known with respect to the studio sync pulses at any of the chosen operating speeds, and this is used to ensure that the read and write sequences of the stores 12, 13, never coincide.

The stores preferably contain enough memory to store two complete frames of the picture, and the sequence is commenced by writing into one of the frame memories in each store. When a frame is complete in one store, readout is commenced at the beginning of the next television field determined by the studio sync generator. The next film frame is then written immediately into the second memory frame of the store, while the first frame is read continuously and repeatedly until the second frame is completely written into the store. Readout will then switch to the second frame at the start of the next television field. There can be a time interval between the end of writing one frame and reading of that frame, in which case writing must commence at the beginning or top of the other frame while it is still being read, but this is possible since it will not be necessary to read any more complete fields from this frame memory, which means that although writing into the top of one frame memory has commenced reading out from the bottom of the same memory can continue until completed without interference.

The variable frequency oscillator 25 generates the clock pulses for the linear image sensors 6, 7 and 8 which are fed via an AND gate 20, this gate allows "X" clock pulses through to the linear image sensors there being X elements in each sensor, sequentially energised by the clock pulses from the variable frequency oscillator 25. The clock pulses are blocked by the output of counter 24 closing the AND gate 20 after it has counted "X" clock pulses for a count of "Y" which is counted by a counter 18; the count of "Y" represents the horizontal blanking period. Therefore after a count of (X+Y) which represents the total horizontal scan period, the counter 24 is reset by the output of counter 18 and the cycle starts again.

The horizontal scan pulses at the output of the counter 18 are divided by a programmable counter 29, this counter being set to determine the total number of horizontal scan periods in one film frame; the output of the counter 29 is compared with the film frame pulses in a phase comparator 30 which then controls the variable frequency oscillator 25. In this way, if the film frame speed varies, the number of horizontal scan periods occurring during each film frame nevertheless remains the same, maintaining the same picture aspect ratio. Also, by changing the count of the programmable counter 29, the number of horizontal scan periods per film frame can be varied, thus varying the effective vertical picture height, to control the aspect ratio of various film formats.

Thus without requiring the use of interpolation, the aspect ratio of the scanning can be adjusted to accommodate any combination of motion picture film parameters or television standards.

Figure 2:
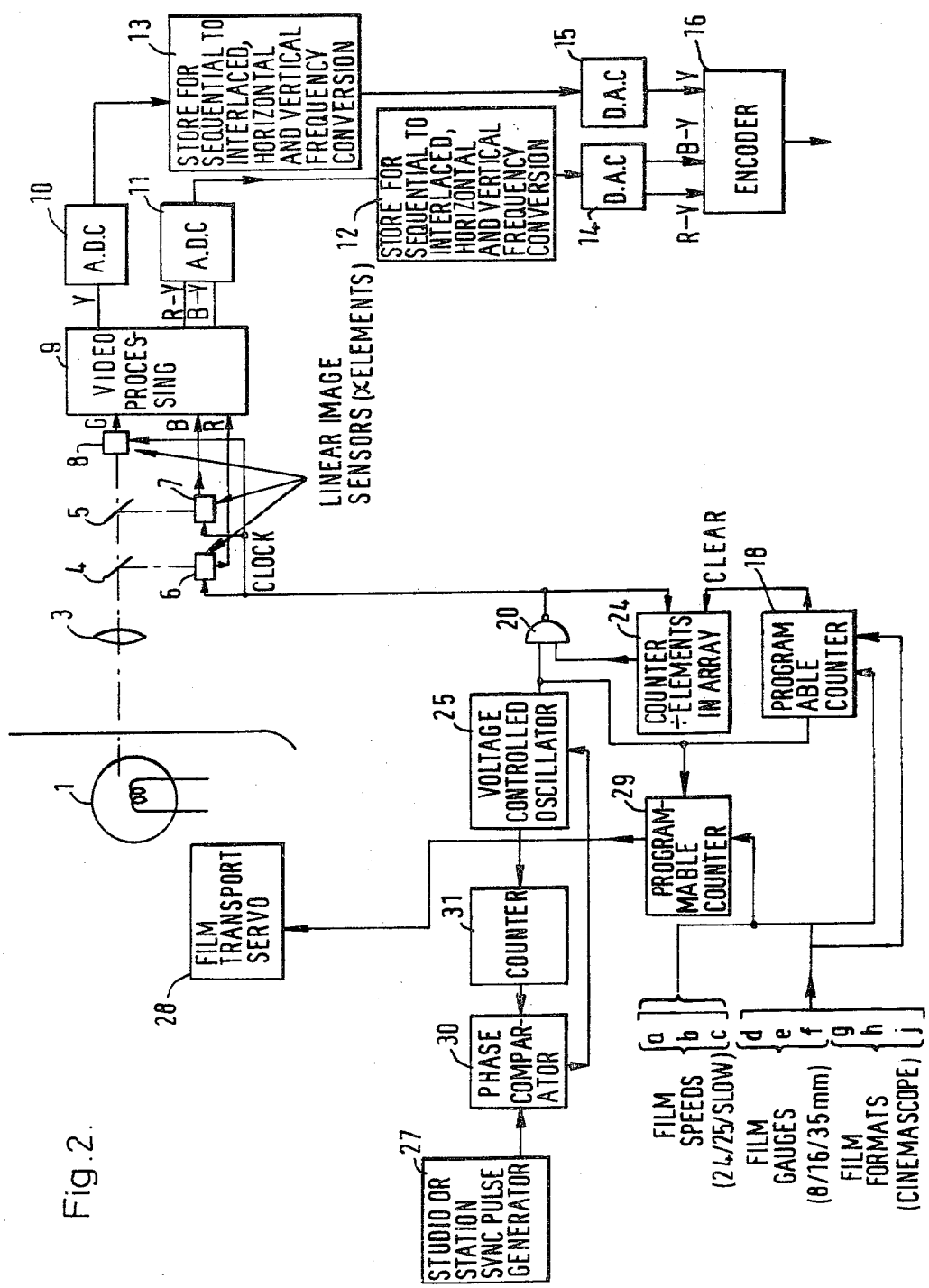
FIG. 2 is a block schematic diagram illustrating a second embodiment which is a modification of the embodiment illustrated in FIG. 1.

Referring now to FIG. 2 the second embodiment shown utilises similar elements and those elements which fulfil the same or substantially similar functions as corresponding elements in FIG. 1 are identified with the same reference numerals. In this embodiment the optical system from the light source 1 leading through to the encoder 16 is identical with the embodiment of FIG. 1 with the exception that the sensor array 6, 7, 8 is driven differently by a circuit shown in block schematic form and comprising a voltage controlled oscillator 25 which is phase locked to horizontal sync from the studio sync generator 27 by means of the counter 31 and phase comparator 30. The output from the voltage controlled oscillator is fed to a gate 20 the output from which feeds the sensor array 6, 7, 8 and the second input to which is controlled by a counter 24 which counts up to the number of elements in an array, and the count input of which is fed from the output of the gate 20 so that it receives the same signals as are fed to control the sensor array 6, 7, 8. When the counter 24 has counted up to the number of elements in the array it operates to inhibit the passage of further pulses through the gate 20. The clear input of the counter 24 is fed from the output of a programmable counter 18 the input of which is fed with pulse signals from the output of the voltage controlled oscillator 25 and the programme inputs of which are fed from setting devices producing signals representing the film speed, film gauge and film format as shown schematically in FIG. 2. When the programmable counter has reached the count set by the input parameters it produces an output pulse to clear the counter 24 thereby allowing a new sweep to commence and therefore effectively determining the scan frequency by clearing the counter 24 a selected (but variable in dependence on the input parameters) time after the end of the active scan thus determining the scan frequency of the linear array.

Such a system has the practical advantage that the linear array of sensors 6, 7, 8 is always scanned at a constant fast rate and the charge information in the array is transferred to the memory (the stores 12, 13) before significant leakage occurs. The voltage controlled oscillator 25 is now operating at a fixed frequency at all times, the voltage control only providing synchronisation to the studio sync pulse generator 27.

The film speed is sychronised by another programmable counter 29 which receives pulse inputs from the output of the voltage controlled oscillator 25 and a program input from the film speed setting device. The output of the programmable counter 29 is fed to the film transport servo 28 as before.

Figure 3:
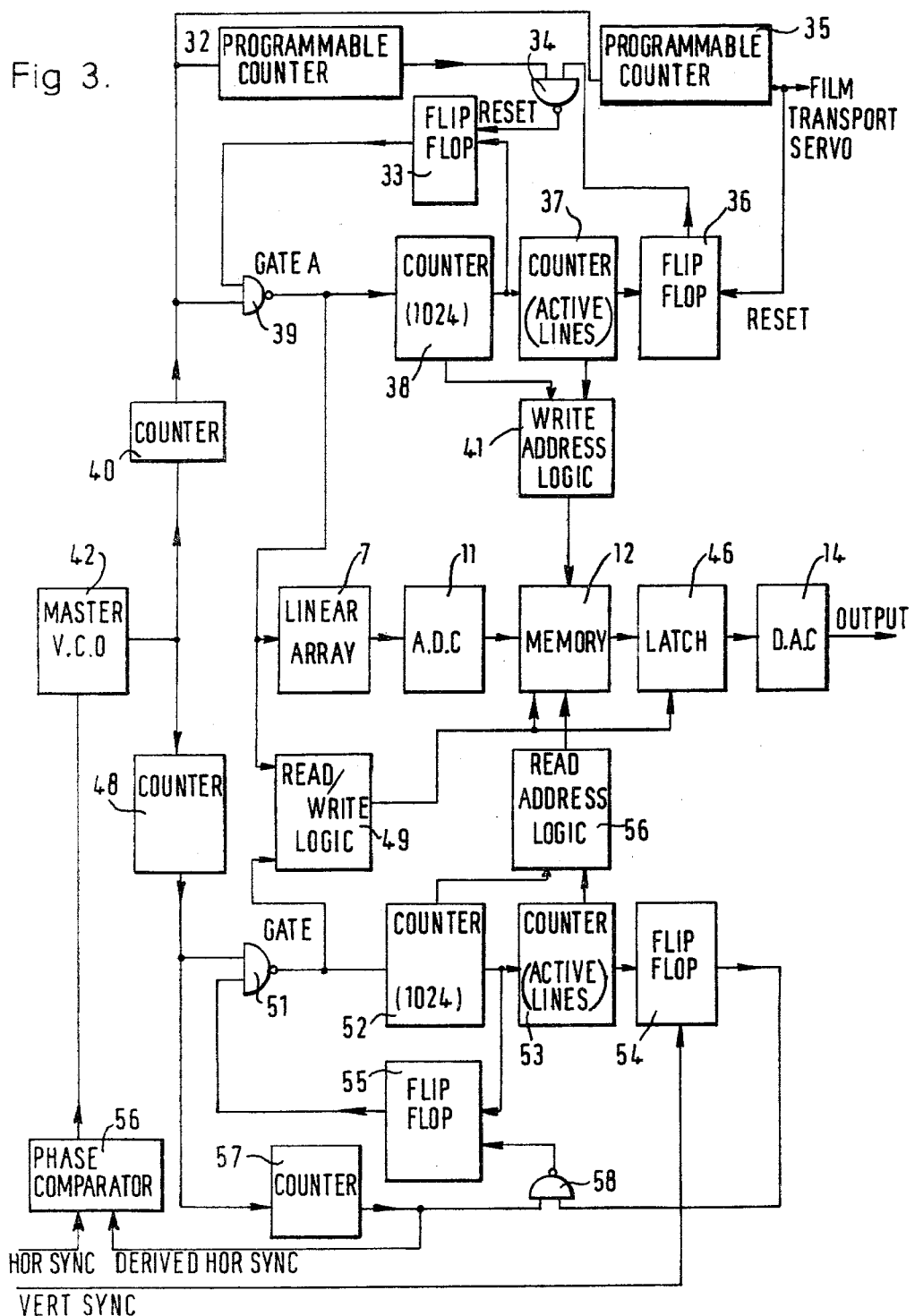
FIG. 3 is a block schematic diagram illustrating a third embodiment of the invention illustrating the store organisation in greater detail.

Referring now to FIG. 3 the alternative embodiment shown is illustrated in slightly greater detail, omitting the optical components and representing only one of the linear arrays of image sensors 6, 7, 8; for example, the linear array has been indicated with the reference numeral 7. As in the preceding embodiments, the linear array feeds its output signals via an analogue-to-digital converter 11 to a memory or store 12.

The clock frequency at which the linear array 7 is clocked is determined by a master voltage controlled oscillator 42 which is phase linked to the studio syncs by a phase comparator 56 the inputs to which are the horizontal sync pulse signals from the studio sync pulse generator (not shown) but equivalent to the studio sync pulse generator 27 in the embodiments of FIGS. 1 and 2; the other input to the phase comparator 56 is a derived horizontal sync signal from the output of a counter 57 which is fed from a counter 48 driven by the master voltage controlled oscillator 42.

The output from the master voltage controlled oscillator 42 is also fed to a "write" counter 40 (the counter 48 being a "read" counter), the two counters being required because the clock frequency at which the memory is "read" is fixed and determined by the television system being transmitted, and this "read" clock frequency is much higher than the frequency of the sync pulses available from the studio sync generator. The master voltage controlled oscillator 42 thus runs at a frequency sufficiently high to be divided down by the counter 48 to the frequency required for the "read" clock frequency and also to be divided down by the counter 40 to a suitable frequency for the "write" clock frequency, that is the frequency of sampling the detector elements in the linear sensor array 7.

The output from the counter 48 is then divided down further by the counter 57 to the frequency of the horizontal sync pulses from the studio or station sync pulse generator fed into the phase comparator 56.

The frequency at which the detectors in the linear sensor array 7 are sampled is therefore fixed, and the changes in the scanning frequency are effected by altering the spacing between successive "blocks" of write clock pulses. This is achieved by the circuit shown as follows: the output pulses from the counter 40 are fed to a gate 39, and also to a first programmable counter 32 and a second programmable counter 35. The output from the gate 39 is fed to a line scan counter 38 set to count the number of elements in the linear sensor array 7, and a frame scan counter 37 set to count the number of active lines in the television field. The output from the line scan counter 38 is also fed to a flip-flop circuit 33 the output from which is fed to the gate 39 and the output from the frame scan counter 37 is fed to a flip-flop 36 the output of which is fed one input of a gate 34 the other input of which is fed from the output of the first programmable counter 32. The output of the gate 34 is fed to the reset input of the flip-flop 33. The reset input of the flip-flop 36 is fed from the output of the second programmable counter 35.

The outputs from the line scan counter 38 and frame scan counter 37 are also fed to a write address logic circuit 41 which controls the addressing of the memory 12 so that information signals from the linear sensor array 7 are directed to addresses in the memory 12 determined by the particular values counted at any given time by the line scan counter 38 and the frame scan counter 37, the contents of these counters thus uniquely defining the address of the memory 12 at which the particular sampled signal above a given sensor in the linear array 7 is stored.

If, for example, the sensor array 7 contains 1024 elements then the counter 38 would count to 1024 and then produce an output signal which would step frame scan counter 37 on by one step and at the same time drive the flip-flop 33 to close gate 39. Further pulse signals from the counter 40 are thus inhibited from reaching either the linear sensor array 7 or the line scan counter 38, but continue to reach the first and second programmable counters 32, 35. The first programmable counter 32 corresponds to the counter 18 in the embodiment of FIG. 2, and is programmed by signals representing the film speed, film gauge and film format to count a number larger than the line scan (1024) by an amount required to set the scanning frequency to an appropriate value. At the end of the count of the programmable counter 32 a pulse is produced by the gate 34 to reset flip-flop 33, re-open gate 39 and allow the counter 38 to commence counting again.

This sequence continues until the required number of active lines in the picture field have been completed as determined by the frame scan counter 37 which, when it completes its count, puts out an impulse to flip-flop 36 which inhibits gate 34 so that, at the end of the last line, when the flip-flop 33 is inhibited by the output from the line scan counter 38, no reset signal can be received from the gate 34. No more blocks of signals are generated until the second programmable counter 35 reaches the end of its count, which sets the film frame count, resets flip-flop B and the sequence repeats on the next film frame.

As mentioned before, the line scan counter 38 and frame scan counter 37 therefore contain the total number of bits or elements in a complete picture and the binary numbers in these counters at any one time can be used to generate the "write" address, which is the function of the write address logic. The "read" section of the memory organisation is very similar to the "write" section comprising the "read" counter 48 which produces pulses at a faster rate than the "write" counter 40 and feeds these to a gate 51 output pulses from which are fed to a line scan counter 52 which feeds output signals to a frame scan counter 53, to a flip-flop 55 which controls the gate 51, and to a "read" address logic circuit 56 which also receives signals from the frame scan counter 53. The output from the frame scan counter 53 is fed to a second flip-flop 54 the output from which is fed to a gate 58 which controls the resetting of the flip-flop 55 which controls the gate 51.

The gate 58, which corresponds to the gate 34 instead of being controlled by a programmable counter such as the counter 32, is controlled by the derived horizontal sync pulse output by the counter 57, and the flip-flop 54 instead of being reset by the output from a programmable counter such as the counter 35 in the "write" section, is reset by a vertical sync pulse derived from the studio systems.

The output from the gate 51 is also fed to a read/write logic circuit 49 which also receives signals from the counter 40 via the gate 39 (the same signals which are fed to the linear sensor array 7). The purpose of the read/write logic is to separate the "read" and "write" cycles within the memory, this being necessary because the "read" and "write" clock pulse frequencies differ as mentioned above. The read/write logic operates to take the shortest write or read cycle time likely to be required, which in this case is the time between write clock pulses, multiply this time by 0.5, which then becomes the memory cycle time. It is then possible to complete separate read and write cycles between write clock pulses. If write and read commands arrive at the same instant, therefore, the read/write logic operates on one of the commands and stalls the other, and when the first command operation has been completed the second is initiated.

What is claimed is:

1. Apparatus for producing television picture signals from motion picture film, said apparatus comprising means for repeatedly scanning the film horizontally along a single fixed line at a scanning station; means for transporting the film vertically past the scanning station during such horizontal scanning to produce a plurality of sequential line scan signals;

means for varying the scanning repetition frequency of the horizontal scanning so as to permit, for any one of a plurality of different film sizes and/or transport speeds, a predetermined number of horizontal line scans to be performed in respect of each frame of the motion picture film, and means for processing said line scan signals to produce a plurality of television picture fields having line and field frequencies conforming to a predetermined television standard.

2. Apparatus as in claim 1, wherein said means for varying said scanning repetition frequency comprises a variable frequency oscillator whose frequency of oscillation determines the scanning repetition frequency, and means for adjusting the operating frequency of said variable frequency oscillator.

3. Apparatus as in claim 2, further comprising a film frame sync pulse generator which generates pulses synchronized with a studio or station sync pulse generator and means for synchronizing the film transport with the output from said variable frequency oscillator and with the output signal from said film frame sync pulse generator.

4. Apparatus as in claim 1, wherein said horizontal scanning means comprises at least one linear array of sensors arranged to be illuminated with light transmitted through the film.

5. Apparatus as in claim 4, wherein said horizontal scanning means further comprises means for simultaneously illuminating all said sensors with light transmitted through said motion picture film and means for effecting sequential electrical scanning of the sensors of the array whereby to produce a plurality of discrete electrical signals together representing the information content of a television scan line.

6. Apparatus as in claim 4, wherein said horizontal scanning means further comprises means for sequentially illuminating the sensors of the array by a scanning light beam.

7. Apparatus as in claim 4, 5 or 6, wherein the horizontal scanning means is adapted to scan said array of sensors at a fixed speed and wherein the means for varying the scanning repetition frequency comprises means for varying the time interval between successive scans.

8. Apparatus as in claim 7, wherein the means for varying the time interval comprises a programmable counter whose programmed count determines the time interval between successive scans, the programmed count of said programmable counter being controlled by inputs representing the film speed, the film gauge and the film format.

9. Apparatus as in claim 8, wherein the horizontal scanning means further comprises a fixed counter which counts up to the number of elements in the array of sensors, the input of which counter is connected to a line feeding scanning control pulses to the array of sensors, said counter operating to inhibit the feeding of such scanning control pulses when it has reached its maximum count, until cleared by an output signal from said programmable counter.

10. Apparatus as in claims 4, 5 or 6, wherein the horizontal scanning means comprises a plurality of linear arrays of sensors and a plurality of optical filters, whereby the sensor arrays produce respective line scan signals representing differently coloured components of the motion picture frame.

11. Apparatus as in claim 10, wherein the processing means comprises means for converting the line scan signals into chrominance and luminance signals.

12. Apparatus as in claim 11, wherein the processing means comprises means for converting the line scan signals into digital form.

13. Apparatus as in claim 12, wherein the processing means further comprises means for temporarily storing the digital picture information derived from each frame of the motion picture film, and means for reading out said information from storage in accordance with a predetermined program.

14. Apparatus as in claim 10, wherein the processing means comprises means for converting the line scan signals into digital form.

15. Apparatus as in claim 14, wherein the processing means further comprises means for temporarily storing the digital picture information derived from each frame of the motion picture film, and means for reading out said information from storage in accordance with a predetermined program.

* * * * *